J. AXELSTROM.
MACHINE FOR STRINGING TAGS.
APPLICATION FILED OCT. 5, 1914.

1,170,214.

Patented Feb. 1, 1916.
5 SHEETS—SHEET 1.

Witnesses:
Leo J. DuMais.
Arthur B. Framke.

Inventor.
John Axelstrom,
by Robert Burns, Atty.

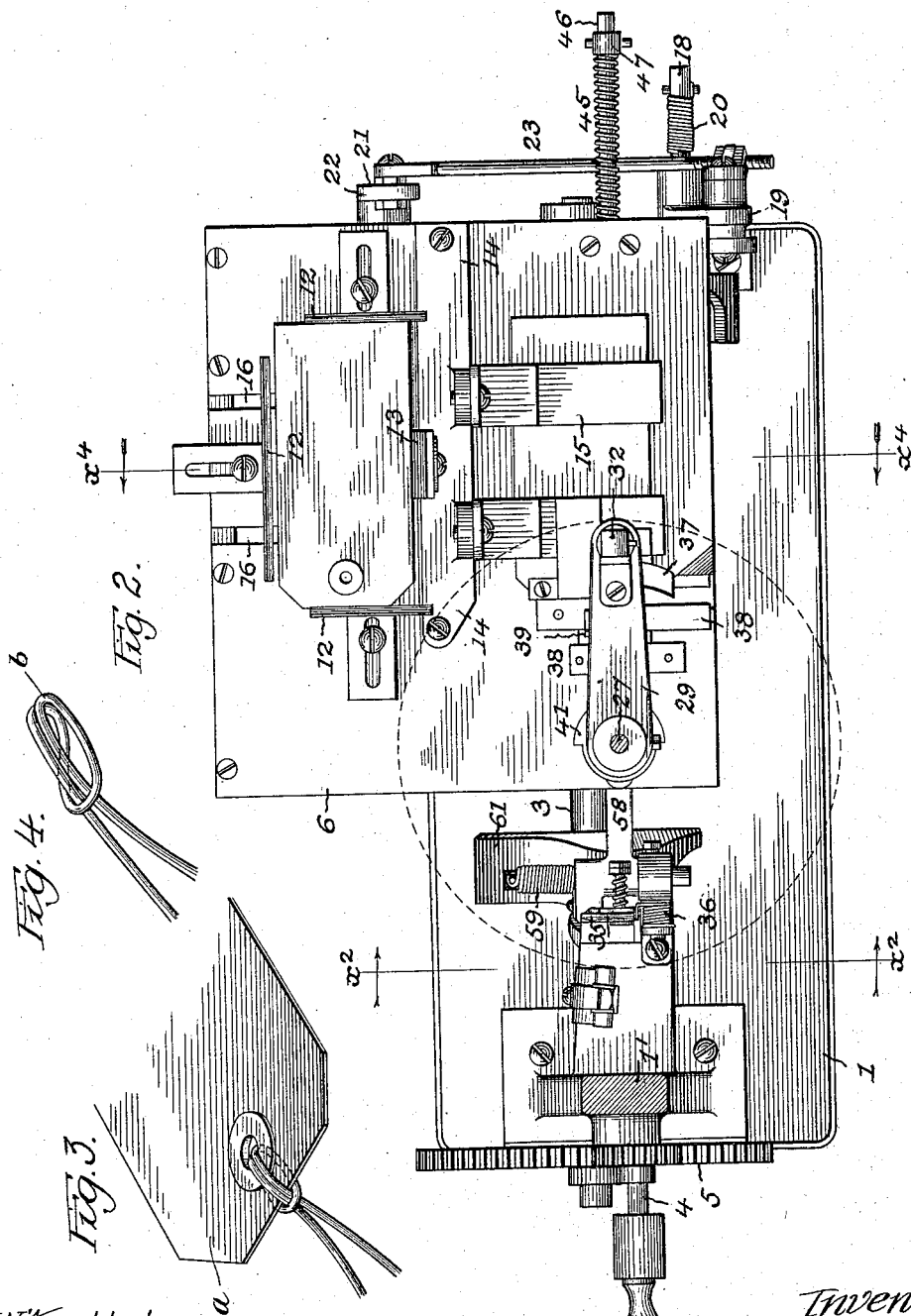

J. AXELSTROM.
MACHINE FOR STRINGING TAGS.
APPLICATION FILED OCT. 5, 1914.

1,170,214.

Patented Feb. 1, 1916.
5 SHEETS—SHEET 3.

Witnesses:
Leo J. Dumais.
Arthur B. Franke.

Inventor.
John Axelstrom,
by Robert Burns
Atty.

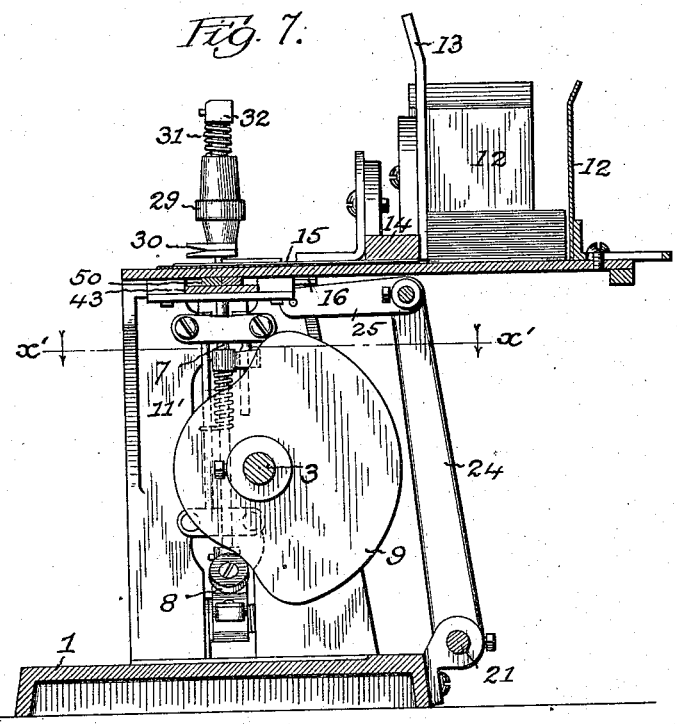
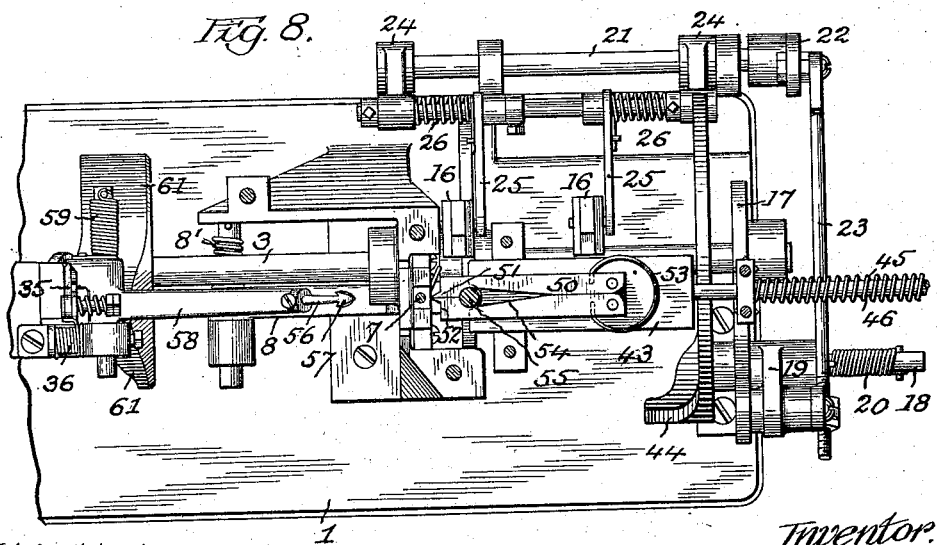

J. AXELSTROM.
MACHINE FOR STRINGING TAGS.
APPLICATION FILED OCT. 5, 1914.

1,170,214.

Patented Feb. 1, 1916.
5 SHEETS—SHEET 5.

Witnesses:
Leo J. Dumais.
Arthur B. Framke.

Inventor.
John Axelstrom,
By Robert Burns. Atty.

UNITED STATES PATENT OFFICE.

JOHN AXELSTROM, OF CHICAGO, ILLINOIS.

MACHINE FOR STRINGING TAGS.

1,170,214.   Specification of Letters Patent.   Patented Feb. 1, 1916.

Application filed October 5, 1914. Serial No. 864,996.

*To all whom it may concern:*

Be it known that I, JOHN AXELSTROM, a citizen of the United States of America, and a resident of Chicago, in the county of Cook, State of Illinois, have invented certain new and useful Improvements in Machines for Stringing Tags, of which the following is a specification.

This invention relates to that class of machines for stringing tags and the like, in which a length of string is doubled upon itself and the looped end thus formed is pushed through the eye or orifice of the tag, after which the doubled ends of the string are drawn through the looped end aforesaid to secure the section of string to the tag, with a pair of loose string ends adapted for ready tying to an article to be tagged. And the present improvement has for its object to provide an efficient and durable structural formation and association of parts adapted to automatically operate in successive and timed relation, and whereby the tags are singly and successively fed to the stringing point, and coincident with such feeding movement and the period intervening between the feeding of a succeeding tag, a length of string or twine drawn from a suitable supply reel, is doubled upon itself to form a looped end after which such looped end is drawn through the eye of the tag and engaged by a combined carrying and spreading means and such looped end is spread and carried beneath the other portions or ends of the length of string, after which the last mentioned string ends or portions are drawn through the laterally spread loop portion to complete the tying operation, all as will hereinafter more fully appear and be more particularly pointed out in the claims.

Figure 1:
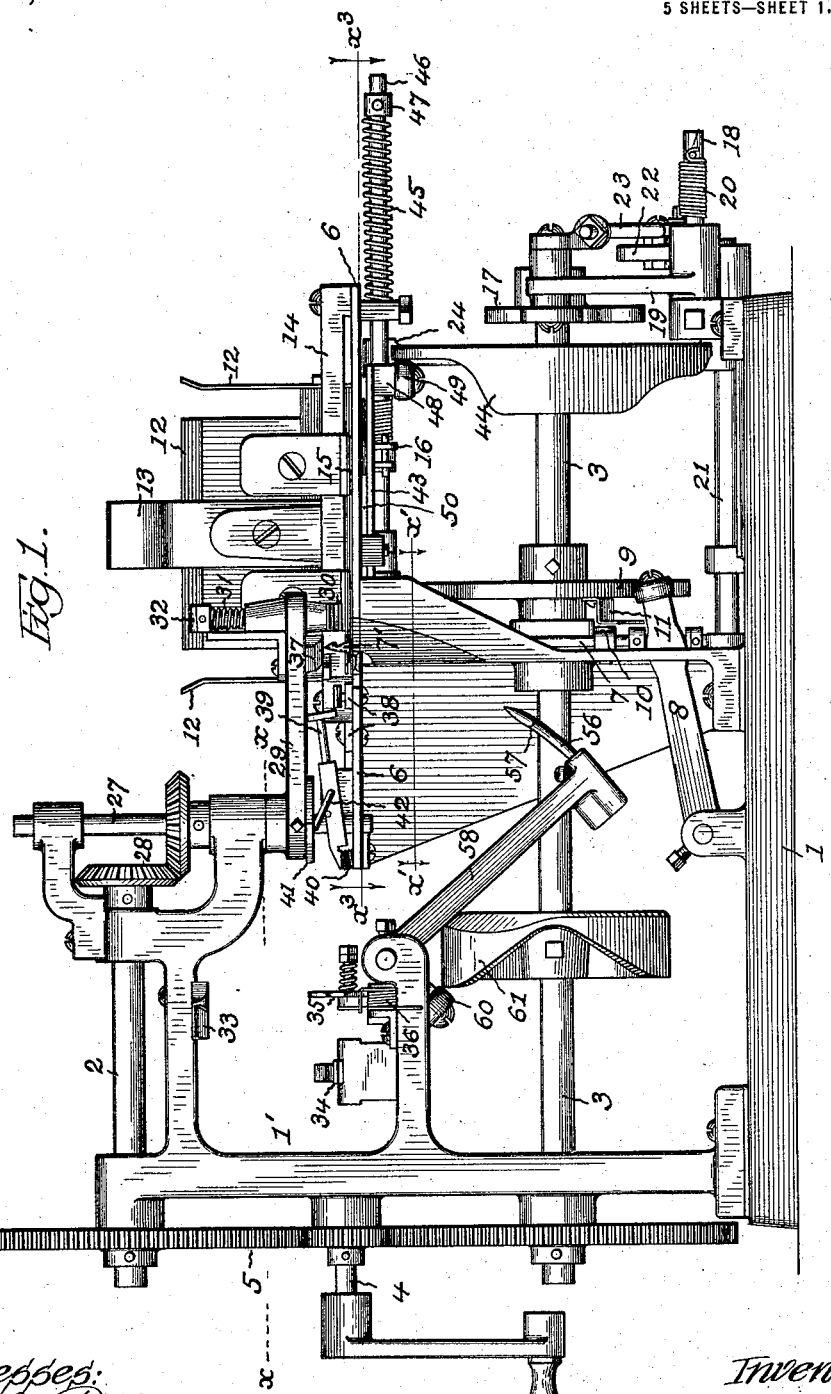
Figure 5:
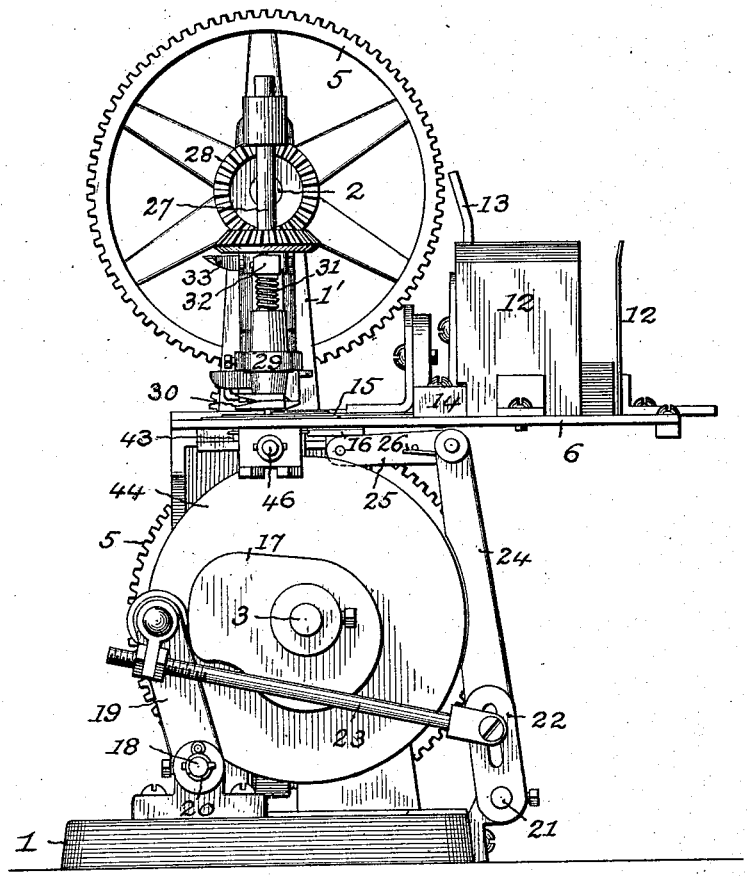
Figure 6:
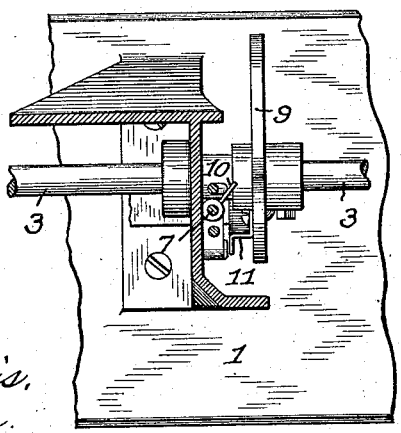
Figure 9:
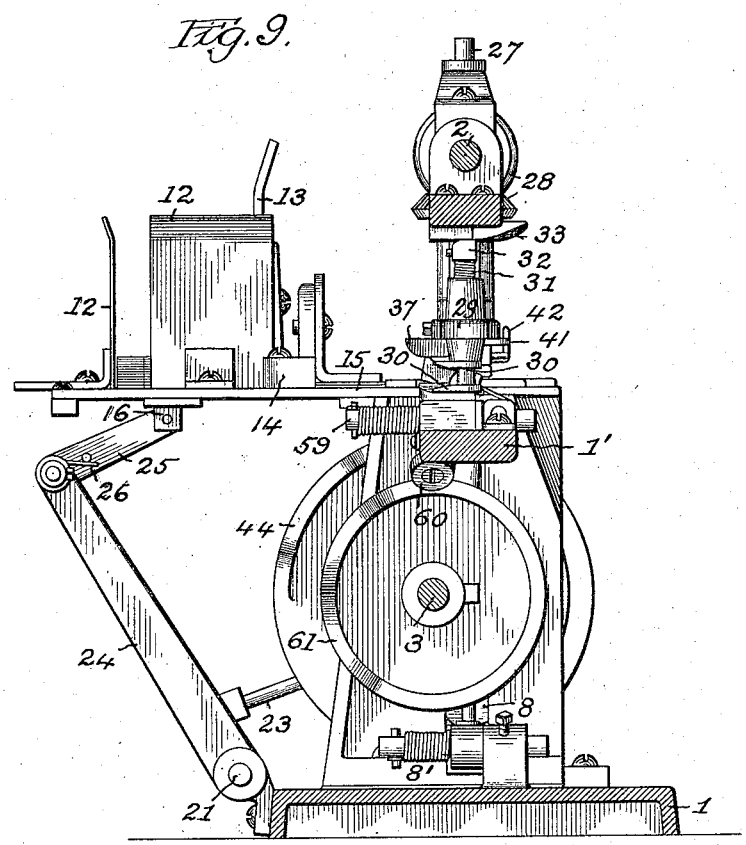
Figure 10:
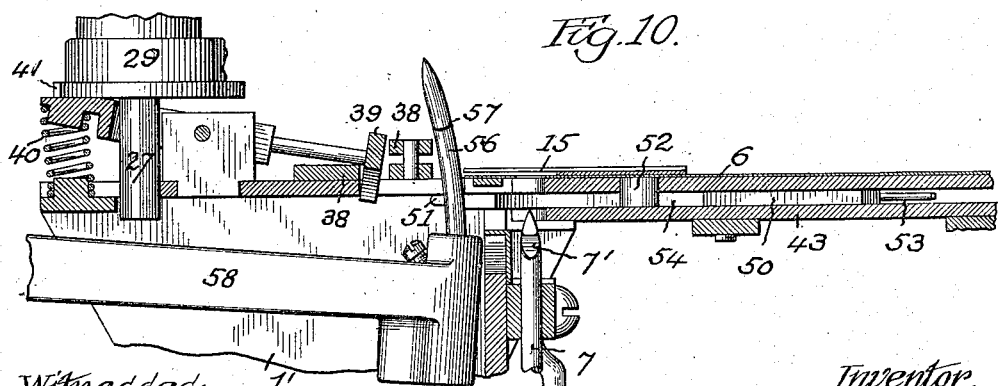

In the accompanying drawings: Figure 1, is a side elevation of a machine embodying the present invention. Fig. 2, is a sectional plan view on line $x$—$x$, Fig. 1. Fig. 3, is a detail perspective view of a tag, strung by the present mechanism. Fig. 4, is a detached perspective view of the tie or knot formed by the present mechanism. Fig. 5, is a front end elevation. Fig. 6, is a detail horizontal section on line $x'$—$x'$ Figs. 1 and 7, showing the means for imparting intermittent semi-rotation to the looper stem. Fig. 7, is a transverse section on line $x^4$—$x^4$, Fig. 2. Fig. 8, is a detail sectional plan on line $x^3$—$x^3$, Fig. 1 of the loop carrying and spreading mechanism. Fig. 9, is a transverse section on line $x^2$—$x^2$, Fig. 2. Fig. 10, is an enlarged detail longitudinal section, illustrating the initial loop forming mechanism, the loop carrying and spreading mechanism and the final tying or knotting mechanism.

Similar reference numerals indicate like parts in the several views.

Referring to the drawings, $a$ represents an ordinary shipping tag, and $b$ the loop of string which is knotted therein by the present mechanisms.

1 designates the main supporting frame of the machine which in the construction shown comprises a supporting bed or base, a main standard 1' and a plurality of supplementary standards, affording bearings for the series of operating shafts, as well as a support for the top plate or table upon which the tags are supported and manipulated during the stringing and tying operations.

2, designates the upper, and 3 the lower longitudinally disposed cam carrying shafts of the present mechanism. Said shafts have bearings in the above mentioned standards of the main frame 1, and receive simultaneous rotation from a centrally disposed driving shaft 4, operatively connected to said shafts 2, 3, by a train of spur gears 5, or other usual operative connections.

6 designates the supporting plate or table above referred to, and which is located at one end of the machine and fixedly attached to the upper ends of the supplementary standards aforesaid. At one side the table 6 carries a hopper in which the tags are stacked, and on its underside a longitudinally reciprocating loop carrying and spreading mechanism, hereinafter described in detail.

7 designates the vertically arranged stem around which a length of string is looped and held during the preliminary operation of stringing a tag with the present mechanism. Said stem has movement in guides on one of the standards of the machine and moves up through an opening or passageway in the plate or table 6, to constitute a projection around which the above mentioned loop in the length of string, is laid by the means hereinafter described, and with a view to hold the loop or bend in the length of string in the proper position the stem 7 aforesaid is formed with a side lip or recesses 7' near its upper end, in which the bend or loop in the string is received and held in a positive manner.

8 designates an intermediate cam lever operatively connected to the stem 7, and having an upward tendency under the influence of a spring 8', on its pivot pin or shaft.

9 designates a cam carried on the lower shaft 3, and operatively engaging the cam lever 8, aforesaid to move the same positively in a downward direction.

The looper stem 7, above described, also receives an intermittent semi-rotary movement on its vertical axis, through a lateral arm 10 near its lower end, which is adapted at the proper period in the operation of the machine to be engaged by a cam or tappet projection 11 on the cam 9, aforesaid, and receive therefrom a turning movement in a horizontal plane, for the purpose set forth in the operation of the machine. Said semi-rotary movement of the stem 7, is positive in one direction under the influence of the cam or tappet 11, and in the opposite direction is resiliently effected by a spring 11' illustrated in Fig. 7.

The tag holding magazine or hopper, and the means for serially feeding the tags therefrom to the stringing and tying mechanisms of the present machine, involves in the preferred form of the present invention, as illustrated in Figs. 1, 2, 5, 7, 9 and 10, of the drawings, the following structural arrangements and details: 12 designates a series of three vertical plates or members secured to the table 6, in a slidingly adjustable manner, and adapted in connection with a fourth and vertically adjustable plate or member 13, to provide a tag holding compartment of a size corresponding with that of the tags to be operated on. 14 designates a bridge bar fixed on the table 6, and located a slight distance above the same, to provide a throat or passage through which a single tag can be fed laterally by means hereinafter described into a position to be strung. The adjustable hopper plate 13 above described is adjustably mounted on said bridge bar 14, and is adapted for vertical adjustment thereon to regulate the height of the aforesaid throat or passage to correspond with the thickness of the tags operated on. 15 designates laterally extending spring fingers carried by the bridge bar 14, and under which the tags are fed to, and held at, the stringing position aforesaid. 16 designates a sliding head moving in transverse guideways on the table 6, aforesaid, and provided with suitable tag engaging prongs or projections extending a short distance above the upper surface of the table 6, and adapted to engage the lowermost tag in the aforesaid hopper and carry the same laterally to the stringing position above referred to.

Intermittent reciprocation is imparted to the sliding head 16, in unison with the other mechanisms of the machine by operative connections as follows: 17 designates a cam disk carried on the shaft 3 aforesaid and having operative connections with a primary rock shaft 18, through the cam arm 19, to impart motion to said rock shaft in one direction. A movement in the opposite direction is imparted to said rock shaft by a coiled spring 20 encircling the same, as shown in Figs. 1, 2, 5 and 8. 21 designates a secondary rock shaft operatively connected to the aforesaid primary rock shaft 18 by a slotted rock arm 22, and an adjustable connecting link 23, the adjustment of which regulates the position and throws of the tag feeding head 16, aforesaid, and as usual in the present type of feeding mechanisms. 24 designates companion rock arms on the rock shaft 21, connected by intermediate links 25, with the tag feeding head 16, aforesaid. In the present construction the links 25, exert an upward resilient tendency on the tag feeding head 16, through springs 26, so that said heads may ride easily under the tags contained in the tag containing hopper of the machine, and move into engagement with the lowermost tag in said hopper as said slide nears the end of its return stroke. 27 designates a vertically arranged shaft, journaled in the main standard 1' of the machine, and operatively connected to the upper longitudinal shaft 2, aforesaid, by a pair of miter gears 28, as illustrated in Fig. 1. 29 designates a horizontally disposed arm carried on the lower end of the aforesaid shaft 27, and having a continuous circular movement in a horizontal plane, above the table 6, aforesaid. 30 designates a pair of string gripping and carrying jaws, mounted on the outer end of the horizontal arm above described, and moving in a circular and horizontal path. In the preferred construction shown in Figs. 1, 2, 5, 7 and 9, one of said jaws is fixed, and the other jaw movable and opening against the resiliency of a spring 31. To such end the movable jaw is mounted on a carrying stem 32, moving vertically in guides on the outer end of the aforesaid arm 29, with its upper end adapted to contact with and be actuated by a fixed cam or incline 33 on the aforesaid main standard 1' of the machine, to effect an opening of the jaws 30 to release a string end, and to receive a fresh string end projecting from the string holding means now to be described.

34 designates a tension member or guide of an ordinary and suitable construction, mounted on the aforesaid main standard 1' of the machine, outside the horizontal circular path in which the gripping and carrying jaws 30, aforesaid, have movement. The string used in the present mechanism, extends from a suitable supply spool or reel to and through the guide passage of said tension member 34, with its end projecting into the path of the aforesaid jaws 30, to be engaged thereby in the normal operation of the machine. The function of said tension member is to present the string end in the path of the jaws 30, and to prevent any retrograde movement of said string in actual use. 35, designates a pair of cutting jaws mounted on the aforesaid main standard 1' of the machine, inside the circular path in which the aforesaid gripping and carrying jaws 30 have movement, and in alinement with the tension member 34, above described. In the preferred construction of said cutting jaws 35, as shown in Figs. 1, 2 and 8, one of the cutter jaws is fixed, and the companion jaw pivoted to the fixed jaw, and normally held open by a spring 36, associated with said jaws. The said cutting jaws are adapted to be closed and effect a cutting of the string at the proper moment in the operation of the machine, by a cam shoe 37 carried on the horizontal arm 29, aforesaid. 38 designates a pair of fixed holding or tension bars or jaws, and 39 a movable holding jaw associated with said fixed jaws 38. Said jaws are disposed on the main standard 1' of the machine, and located between the cutting jaws 35 and the looper stem 7, before described. The movable jaw 39 aforesaid, is pivoted longitudinally of the machine, and is normally held to its open position by a spring 40, and in the present construction as illustrated in Figs. 1, 2 and 10, is positively moved to a closed position, to engage and hold the ends of the lengths of string used in the tag stringing operation, by a horizontal cam formation 41 on the lower portion of the hub of the horizontal arm 29 aforesaid in conjunction with a bearing member 42, on the side of the movable holding jaw 39, as shown more particularly in Fig. 1. 43 designates a longitudinally reciprocating carriage moving in slides on the underside of the plate or table 6 of the machine, and receiving intermittent longitudinal movement in one direction from a cam 44 on the lower shaft 3, aforesaid, and in the other direction from a spring 45. In the structure shown in the drawings:—46 designates a longitudinally disposed guide rod fixedly attached to the carriage 43, and provided with an adjustable stop collar 47 at its outer end, and between which and an adjacent bearing on the underside of the table 6, the aforesaid spring 45 is disposed, as shown in Fig. 1. 48 designates a depending stud on the underside of the carriage 43, and preferably provided with a bearing disk or roller 49 for operative engagement with the cam 44, aforesaid. 50 designates a pair of counterpart jaw members, pivoted in opposed relation and at their outer ends on the aforesaid carriage 43, and having alined relation to the looper stem 7, before described. The inner and free ends of the jaws 50 are of the square form shown and carry pointed prongs 51 which in connection with square ends of the jaws provide string engaging shoulders 52 at the base of each of the said prongs, as shown in Fig. 8, and for the purpose hereinafter stated. 53 designates a spring engaging the jaw member 50 and tending to resiliently return the same to a closed position, shown in Fig. 8, when not positively opened or spread by the means now described.

54 designates counterpart inclines formed in the adjacent edges of the aforesaid jaws 50; and 55 designates a fixed pin or stud disposed between the said inclines and attached to the underside of the table 6, aforesaid. In a movement of the carriage 43, and jaws 50 toward the looper stem 7, before described, the stud 55 has bearing against the inclines 54, to cause the jaws 50 to spread apart, and effect a corresponding lateral spreading of the loop of string carried by the prongs 51 of said jaws. 56 designates a tying stem or needle, arranged in associated relation to the spreader jaws 50, above described, and formed with oppositely extending hooks or prongs 57, on its respective sides, and near its free end, as shown. Said tying stem or needle 56 has reciprocating movement in a plane transverse to that in which the aforesaid spreader jaws 50, reciprocate, and in a forward or upward movement said needle 56 is adapted to pass through a spread loop of string held by the prongs 51 of the spreader jaws 50, and bring the side prongs 57 into engagement with the end portions of said string. In a succeeding return or downward movement, said needle 56 is adapted to draw the aforesaid end portions of the string through the aforesaid loop portion of said string, and complete the string tying operation, as hereinafter more fully set forth in the operation of the machine. In the preferred construction illustrated in Figs. 1, 2, 8 and 10 of the drawings, the aforesaid tying stem or needle 56 has a curved form and is attached to the longer arm of a bell-crank lever 58, pivoted to the main standard 1' of the machine, and adapted to swing in a vertical-longitudinal plane. 59 designates a coiled spring associated with the pivot pin of the bell crank lever 58, and adapted to impart the above mentioned forward or upward movement to the same, and to the tying needle 56 carried thereon. 60 designates a cam roller mounted on the end of the shorter arm of the bell-crank lever 58, aforesaid, and adapted to bear upon an operating cam 61 secured to the lower shaft 3 of the machine. Said cam is adapted to positively impart the above mentioned return or downward movement to the bell-crank lever 58, and to the tying needle 56 carried thereon, and against the tension of the spring 59, aforesaid.

The operation of the machine is as follows:—Assuming the tag feeding slide 16 to have moved laterally in the direction of the looper stem 7, and positioned an unstrung tag with its eye in vertical alinement with said looper stem 7. With the tag so positioned, the looper stem 7, then rises vertically through said tag eye with its free upper end a distance above the tag. During such rising movement of the looper stem 7, the gripping and carrying jaws 30, in their continued orbital movement in a horizontal plane, are permitted to close, through the instrumentality of the spring 31, stem 32 and incline 33, upon an end of the string projecting from the tension member 34, and attain a gripping engagement with such end of the string. In the continued orbital travel of the said jaws 30, the string is drawn through the tension member 34, laid between the cutting jaws 35, in their normally open condition and between the holding jaws 38, 39, in their like normally open condition then around the looper stem 7 and into engagement with its hook 7' forming a loop in the length of string, then again into the aforesaid holding jaws 38, 39, in their normally open condition. Immediately following such last mentioned passage of the string between the holding jaws 38, 39, said jaws are allowed to close through the instrumentality of the spring 40, cam formation 41, and bearing member 42, upon the two string ends lying within said jaws, to yieldingly hold the same. Simultaneously with the above described closing of the holding jaws 38, 39, the cam shoe 37 operates the cutter jaws 35, to cut or sever the string lying between said jaws, and at the same time the gripping and carrying jaws 30, through the instrumentality of the incline 33, stem 32 and spring 31, are opened to release the string end held during the aforesaid operations, and immediately following such release, the said gripping and carrying jaws 30 through the same instrumentality are allowed to close upon a fresh string end projecting from the tension member 34, for a succeeding cycle in the operation of the machine.

During the above described series of operations, the looper stem 7, descends, and by means of its hook 7' draws the bend or loop end of the string down through the eye of the tag operated on, and brings said bend or loop end into alinement with the loop carrying and spreading jaws 50. The said jaws 50 then advance toward the looper stem 7 and the companion prongs 51 of said jaws pass between the two strands of string constituting said bend or loop, and effect an engagement of the shoulders 52 with said strands or portions of the string. Further advance of the aforesaid jaws 50, draws the looped end of the length of string operated on, from off the looper stem 7 and effects a lateral spreading of the loop end or bend thereof, through the instrumentality of the inclines 54 and stud 55, and as said jaws reach to the end of their described forward movement, the spread loop of the string is held in operative relation above the tying stem or needle 56, and in a plane below that of the two end strands of the string held by the holding jaws 38, 39, aforesaid. A positive and ready release of the string loop or bend from the holding prongs 7' of the looper stem 7 is effected immediately following the engagement of said string loop by the prongs 51 and shoulder 52, by means of a partial rotation of the looper stems 7 through the instrumentality of the lateral arm 10, tappet 11 and spring 11' associated with said stem. The tying stem or needle 56 now moves upward through the aforesaid laterally spread loop of the string, and between the two end strands of said string held by the holding jaws 38, 39, and in such upward movement the side prongs 57 are carried above and engaged with said end strands of the string. With a downward or return movement of the tying stem or needle 56, the aforesaid end strands of the string are drawn through the aforesaid loop or bend of the string, and away from the holding jaws 38, 39. During such downward movement of the tying stem or needle 56, the knot formed by the interlacing of the string parts is drawn tight, due to the tension of the holding jaws 38, 39, and the stress required to draw the string ends out of the same.

During the above described operations, the various mechanisms return to their original positions in proper sequence, and the tag feeding slide 16, again moves laterally toward the looper stem 7, carrying a succeeding unstrung tag to an operative position, and in doing so displaces the previously strung tag from the machine as the initial operation of a succeeding series of the operations above described.

Having thus fully described my said invention what I claim as new and desire to secure by Letters Patent, is:—

1. In a tag stringing and tying mechanism, the combination of a table, a looper stem adapted to draw a loop of string through the eye of a tag resting on said table, means for imparting reciprocation to said stem, string carrying jaws having movement in a path around the looper stem aforesaid and adapted in their movement to place a loop of string around said looper stem, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

2. In a tag stringing and tying mechanism, the combination of a table, a looper stem adapted to draw a loop of string through the eye of a tag resting on said table, means for imparting reciprocation to said stem, string carrying jaws having movement in a circular path which includes the aforesaid looper stem and adapted to place a loop of string around said looper stem, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

3. In a tag stringing and tying mechanism, the combination of a table, a looper stem having a side hook adapted to draw a loop of string through the eye of a tag on said table, means for imparting reciprocation to said stem, string carrying jaws adapted in their movement to place a loop of string around said looper stem, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end and means for imparting reciprocation to said tying needle, substantially as set forth.

4. In a tag stringing and tying mechanism, the combination of a table, a looper stem having a side hook adapted to draw a loop of string through the eye of a tag on said table means for imparting reciprocation to said stem, string carrying jaws having movement in a circular path and adapted to place a loop of string around said looper stem, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

5. In a tag stringing and tying mechanism, the combination of a table, a looper stem adapted to draw a loop of string through the eye of a tag resting on said table, means for imparting reciprocation to said stem, string carrying jaws having movement in a path around the looper stem aforesaid and adapted in their movement to place a loop of string around said looper stem, one of said jaws being movable and held closed by a spring, a stationary cam plate adapted to open said movable jaw, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

6. In a tag stringing and tying mechanism, the combination of a table, a looper stem adapted to draw a loop of string through the eye of a tag resting on said table, means for imparting reciprocation to said stem, the same comprising a spring moving said stem in one direction and a cam and rock arm moving said stem in the opposite direction, string carrying jaws adapted in their movement to place a loop of string around said looper stem, a pair of jaws having movement in a path around the looper stem aforesaid and adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

7. In a tag stringing and tying mechanism, the combination of a table, a looper stem adapted to draw a loop of string through the eye of a tag resting on said table, means for imparting reciprocation to said stem, string carrying jaws having movement in a path around the looper stem aforesaid and adapted in their movement to place a loop of string around said looper stem, a pair of jaws adapted to carry the looped end of the string to a point beneath the end portions of the string and spread said loop portion laterally, means for imparting reciprocation to said pair of jaws, the same comprising a spring moving said jaws in one direction and a cam moving said jaws in the opposite direction, a tying needle adapted to move through said looped end of the string into engagement with the aforesaid end portions of the string and draw same through said looped end, and means for imparting reciprocation to said tying needle, substantially as set forth.

8. In a tag stringing and tying mechanism, the combination of a table, a looper stem adapted to draw a loop of string through the eye of a tag resting on said table, means for imparting reciprocation to said stem, string carrying jaws having movement in a path around the looper stem aforesaid and adapted in their movement to place a loop of string around said looper stem, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, the same comprising a spring moving the needle in one direction and a cam moving said needle in the opposite direction, substantially as set forth.

9. In a tag stringing and tying mechanism, the combination of a table, a looper stem adapted to draw a loop of string through the eye of a tag resting on said table, means for imparting reciprocation to said stem, the same comprising a spring moving said stem in an upward direction and a cam and rock arm moving said stem in a downward direction, string carrying jaws having movement in a path around the looper stem aforesaid and adapted in their movement to place a loop of string around said looper stem, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

10. In a tag stringing and tying mechanism, the combination of a table, a looper stem adapted to draw a loop of string through the eye of a tag resting on said table, means for imparting reciprocation to said stem, string carrying jaws having movement in a path around the looper stem aforesaid and adapted in their movement to place a loop or string around said looper stem, a pair of jaws adapted to carry the looped end of the string to a point beneath the end portions of the string and spread said loop portion laterally, means for imparting reciprocation to said pair of jaws, the same comprising a spring moving said jaws away from the looper stem and a cam moving said jaws toward the looper stem, a tying needle adapted to move through said looper end of the string into engagement with the aforesaid end portions of the string and draw the same through said looped end, and means for imparting reciprocation to said tying needle, substantially as set forth.

11. In a tag stringing and tying mechanism, the combination of a table, a looper stem adapted to draw a loop of string through the eye of a tag resting on said table, means for imparting reciprocation to said stem, string carrying jaws having movement in a path around the looper stem aforesaid and adapted in their movement to place a loop of string around said looper stem, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, the same comprising a spring moving said needle in an upward direction and a cam moving said needle in a downward direction, substantially as set forth.

12. In a tag stringing and tying mechanism, the combination of a table, a looper stem adapted to draw a loop of string through the eye of a tag resting on said table, means for imparting reciprocation to said stem, string carrying jaws having movement in a path around the looper stem aforesaid and adapted in their movement to place a loop of string around said looper stem, string cutter jaws associated with said carrying jaws, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

13. In a tag stringing and tying mechanism, the combination of a table, a looper stem adapted to draw a loop of string through the eye of a tag resting on said table, means for imparting reciprocation to said stem, string carrying jaws having movement in a circular path and adapted to place a loop of string around said looper stem, a horizontal arm carrying said jaws, string cutter jaws located inside the path of carrying jaws, aforesaid, means for operating said cutter jaws, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle substantially as set forth.

14. In a tag stringing and tying mechanism, the combination of a table, a looper stem adapted to draw a loop of string through the eye of a tag resting on said table, means for imparting reciprocation to said stem, string carrying jaws having movement in a circular path and adapted to place a loop of string around said looper stem, a horizontal arm carrying said jaws, string cutter jaws located inside the path of the carrying jaws aforesaid, a cam or incline on the horizontal arm for operating said cutter jaws, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

15. In a tag stringing and tying mechanism, the combination of a table, a looper stem having a side hook adapted to draw a loop of string through the eye of a tag on said table, means for imparting reciprocation to said stem, string carrying jaws having movement in a circular path and adapted to place a loop of string around said looper stem, a horizontal arm carrying said jaws, string cutter jaws located inside the path of the carrying jaws aforesaid, means for operating said cutter jaws, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

16. In a tag stringing and tying mechanism, the combination of a table, a looper stem adapted to draw a loop of string through the eye of a tag resting on said table, means for imparting reciprocation to said stem, string carrying jaws having movement in a circular path and adapted to place a loop of string around said looper stem, a string tension member located outside the path of the carrying jaws aforesaid, string cutter jaws located inside the path of said carrying jaws, means for operating said cutter jaws, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

17. In a tag stringing and tying mechanism, the combination of a table, a looper stem having a side hook adapted to draw a loop of string through the eye of a tag on said table, means for imparting reciprocation to said stem, string carrying jaws having movement in a circular path and adapted to place a loop of string around said looper stem, a string tension member located outside the path of the carrying jaws aforesaid, string cutter jaws located inside the path of said carrying jaws, means for operating said cutter jaws, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

18. In a tag stringing and tying mechanism, the combination of a table, a looper stem having a side hood adapted to draw a loop of string through the eye of a tag on said table, means for imparting reciprocation to said stem, string carrying jaws having movement in a circular path and adapted to place a loop of string around said looper stem, a horizontal arm carrying said jaws, a string tension member located outside the path of the carrying jaws aforesaid, string cutter jaws located inside the path of said carrying jaws, a cam or incline on the horizontal arm for operating said cutter jaws, a pair of jaws adapted to carry the looped end of the string to a point beneath the end portions of the string and spread said loop portions laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

19. In a tag stringing and tying mechanism, the combination of a table, a looper stem adapted to draw a loop of string through the eye of a tag resting on said table, means for imparting reciprocation to said stem, string carrying jaws having movement in a circular path and adapted to place a loop of string around said looper stem, string holding jaws arranged inside the path of said carrying jaws, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

20. In a tag stringing and tying mechanism, the combination of a table, a looper stem adapted to draw a loop of string through the eye of a tag resting on said table, means for imparting reciprocation to said stem, string carrying jaws having movement in a circular path and adapted to place a loop of string around said looper stem, string holding jaws arranged inside the path of said carrying jaws, string cutting jaws also located inside the path of said carrying jaws, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle substantially as set forth.

21. In a tag stringing and tying mechanism, the combination of a table, a looper stem adapted to draw a loop of string through the eye of a tag resting on said table, means for imparting reciprocation to said stem, string carrying jaws having movement in a circular path and adapted to place a loop of string around said looper stem, string holding jaws arranged inside the path of said carrying jaws, a spring tending to hold said holding jaws open, a cam moving with the aforesaid carrying jaws and adapted to close said holding jaws, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, and means for imparting reciprocation to said tying needle, substantially as set forth.

22. In a tag stringing and tying mechanism, the combination of a table, a looper stem adapted to draw a loop of string through the eye of a tag resting on said table, means for imparting reciprocation to said stem, string carrying jaws having movement in a path around the looper stem aforesaid and adapted in their movement to place a loop of string around said looper stem, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, means for imparting reciprocation to said tying needle, a tag containing hopper on the table aforesaid, a feeding slide moving in the bottom of said hopper and adapted to feed a tag to the stringing position, and means for imparting reciprocation to said slide, substantially as set forth.

23. In a tag stringing and tying mechanism, the combination of a table, a looper stem adapted to draw a loop of string through the eye of a tag resting on said table, means for imparting reciprocation to said stem, string carrying jaws having movement in a path around the looper stem aforesaid and adapted in their movement to place a loop of string around said looper stem, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, means for imparting reciprocation to said tying needle, a tag containing hopper on the table aforesaid, a feeding slide moving in the bottom of said hopper and adapted to feed a tag to the stringing position and means for imparting reciprocation to said slide, the same comprising a spring moving said slide in one direction and a cam mechanism moving said slide in the opposite direction, substantially as set forth.

24. In a tag stringing and tying mechanism, the combination of a table, a looper stem adapted to draw a loop of string through the eye of a tag resting on said table, means for imparting reciprocation to said stem, string carrying jaws adapted in their movement to place a loop of string around said looper stem, a pair of jaws adapted to carry the looped end of the string to a point beneath the end portions of the string and spread said loop portion laterally, means for imparting reciprocation to said pair of jaws, a tying needle adapted to move through said looped end of the string into engagement with the aforesaid end portions of the string and draw the same through said looped end, means for imparting reciprocation to said tying needle, a tag containing hopper on the table aforesaid, a feeding slide moving in the bottom of said hopper and adapted to feed a tag to the stringing position, and means for imparting reciprocation to said slide, the same comprising a spring for imparting a return movement to the slide, and a variable cam mechanism for imparting a forward movement to the slide, substantially as set forth.

Signed at Chicago, Illinois, this 1st day of October, 1914.

JOHN AXELSTROM.

Witnesses:
ROBERT BURNS,
IVA L. CRANE.

Copies of this patent may be obtained for five cents each, by addressing the "Commissioner of Patents, Washington, D. C."